(12) United States Patent
sen Sarma et al.

(10) Patent No.: US 7,788,361 B2
(45) Date of Patent: *Aug. 31, 2010

(54) SYSTEM AND METHOD FOR TRANSFERRING VOLUME OWNERSHIP IN NETWORKED STORAGE

(75) Inventors: Joydeep sen Sarma, Redwood City, CA (US); Alan L. Rowe, San Jose, CA (US); Samuel M. Cramer, Sunnyvale, CA (US); Susan M. Coatney, Cupertino, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,130

(22) Filed: Oct. 4, 2007

(65) Prior Publication Data
US 2008/0021992 A1 Jan. 24, 2008

Related U.S. Application Data

(63) Continuation of application No. 10/027,020, filed on Dec. 21, 2001, now Pat. No. 7,296,068.

(51) Int. Cl.
*G06F 15/173* (2006.01)
(52) U.S. Cl. ............... 709/223; 709/226; 711/154; 711/156
(58) Field of Classification Search ............... 709/223, 709/226; 711/154, 156
See application file for complete search history.

(56) References Cited

U.S. PATENT DOCUMENTS

| | | | |
|---|---|---|---|
| 5,157,667 A | 10/1992 | Carusone et al. | |
| 5,163,131 A | 11/1992 | Row et al. | |
| 5,355,453 A | 10/1994 | Row et al. | |
| 5,485,579 A | 1/1996 | Hitz et al. | |
| 5,787,460 A | 7/1998 | Yashiro et al. | |
| 5,790,782 A | 8/1998 | Martinez et al. | |
| 5,802,366 A | 9/1998 | Row et al. | |
| 5,812,761 A | 9/1998 | Seki et al. | |
| 5,819,292 A | 10/1998 | Hitz et al. | |
| 5,835,940 A | 11/1998 | Yorimitsu et al. | |
| 5,872,906 A | 2/1999 | Morita et al. | |
| 5,892,955 A | 4/1999 | Ofer | |
| 5,894,588 A | 4/1999 | Kawashima et al. | |
| 5,931,918 A | 8/1999 | Row et al. | |

(Continued)

OTHER PUBLICATIONS

American National Standards Institute, Inc. American National Standard for Information Technology; Fibre Channel- Physical and Signaling Interface (FC-PH); Nov. 14, 1994.

(Continued)

*Primary Examiner*—Yves Dalencourt
(74) *Attorney, Agent, or Firm*—Cesari and McKenna, LLP

(57) ABSTRACT

In a method for operating a data storage system, a request is issued that an ownership attribute of a logical arrangement of storage space associated with a first storage system be associated with a second storage system. In response to the request, the ownership attribute is changed to a state of unowned. In response to the request, and in response to the state of unowned, the ownership attribute of the logical arrangement of storage space is changed to a new set of attributes associated with the second storage system to change ownership of the logical arrangement of storage space from the first storage system to the second storage system.

19 Claims, 10 Drawing Sheets

| | | DISK 1 | DISK 2 | DISK 3 | |
|---|---|---|---|---|---|
| | INITIAL STATE | <G, G> | <G, G> | <G, G> | |
| TP1 | STEP 1a | <U, G> | <U, G> | <U, G> | |
| | | <U, U> | <U, U> | <U, U> | INTERMEDIATE STATE |
| | STEP 1b | <G, U> | <G, U> | <G, U> | |
| | | <U, U> | <U, U> | <U, U> | INTERMEDIATE STATE |
| TP2 | STEP 2a | <U, R> | <U, R> | <U, R> | |
| | | <R, R> | <R, R> | <R, R> | COMPLETED STATE |
| | STEP 2b | <R, U> | <R, U> | <R, U> | |
| | | <R, R> | <R, R> | <R, R> | COMPLETED STATE |

U.S. PATENT DOCUMENTS

| | | | |
|---|---|---|---|
| 5,941,972 A | 8/1999 | Hoese et al. | |
| 5,954,822 A | 9/1999 | Yashiro et al. | |
| 5,963,962 A | 10/1999 | Hitz et al. | |
| 6,038,570 A | 3/2000 | Hitz et al. | |
| 6,044,444 A | 3/2000 | Ofek | |
| 6,065,037 A | 5/2000 | Hitz et al. | |
| 6,128,734 A | 10/2000 | Gross et al. | |
| 6,148,414 A | 11/2000 | Brown et al. | |
| 6,233,242 B1 | 5/2001 | Mayer et al. | |
| 6,260,068 B1 * | 7/2001 | Zalewski et al. | 709/226 |
| 6,317,844 B1 | 11/2001 | Kleiman et al. | |
| 6,374,300 B2 | 4/2002 | Masters | |
| 6,425,035 B2 | 7/2002 | Hoese et al. | |
| 6,470,382 B1 | 10/2002 | Wang et al. | |
| 6,513,097 B1 | 1/2003 | Beardsley et al. | |
| 6,622,163 B1 | 9/2003 | Tawill et al. | |
| 6,654,902 B1 | 11/2003 | Brunelle et al. | |
| 6,658,587 B1 | 12/2003 | Pramanick et al. | |
| 6,697,924 B2 | 2/2004 | Swank | |
| 6,708,265 B1 | 3/2004 | Black | |
| 6,718,361 B1 | 4/2004 | Basani et al. | |
| 6,732,289 B1 | 5/2004 | Talagala et al. | |
| 6,748,447 B1 | 6/2004 | Basani et al. | |
| 6,757,695 B1 | 6/2004 | Noveck et al. | |
| 6,760,862 B1 | 7/2004 | Schrieber et al. | |
| 6,804,703 B1 | 10/2004 | Allen et al. | |
| 6,836,832 B1 | 12/2004 | Klinkner | |
| 6,877,109 B2 | 4/2005 | Delaney et al. | |
| 6,883,065 B1 | 4/2005 | Pittelkow et al. | |
| 6,912,627 B2 | 6/2005 | Matsunami et al. | |
| 7,146,522 B1 | 12/2006 | Rowe et al. | |
| 7,159,080 B1 | 1/2007 | Coatney et al. | |
| 7,296,068 B1 * | 11/2007 | Sarma et al. | 709/223 |
| 2002/0078299 A1 | 6/2002 | Chiou et al. | |
| 2002/0083118 A1 | 6/2002 | Sim | |
| 2002/0099914 A1 | 7/2002 | Matsunami et al. | |
| 2003/0005119 A1 | 1/2003 | Mercier et al. | |
| 2003/0033389 A1 | 2/2003 | Simpson | |
| 2003/0061491 A1 | 3/2003 | Jaskiewicz et al. | |
| 2003/0065782 A1 * | 4/2003 | Nishanov et al. | 709/226 |
| 2003/0093501 A1 | 5/2003 | Carlson et al. | |
| 2003/0097611 A1 | 5/2003 | Delaney et al. | |
| 2003/0212863 A1 | 11/2003 | Ganguly et al. | |
| 2004/0230698 A1 | 11/2004 | Oeda et al. | |

OTHER PUBLICATIONS

American National Standards Institute, Inc.; American National Standard for Information Technology—Fibre Channel Arbitrated Loop (FC-AL-2); Dec. 8, 1999.

SNIA Storage Networking Industry Association; Common Internet File System (CIFS), Version: CIFS-Spec. 0.9. Work Group in Progress.

Fibre Channel Generic Services—3 (FC-GS-3), Revision 6.0; NCITS Working Draft Proposed American National Standard for Information Technology; Nov. 24, 1999.

Draft Proposed American National Standard for Information Systems—SCSI-3 Primary Commands; Mar. 28, 1997.

New Identifier Formats Based on IEEE Registration; http://standards.ieee.org/regauth/oui/tutorials/fibreformat.html; Accessed on Aug. 6, 2001.

FTP directory/pub/lvm2/ at ftp://sources.redhat.com/pub/lvm2, no date.

Contents of LVM2.2.01.15.tar (Source code for LVM manager on Linux), downloaded from ftp://sources.redhat.com/pub/lvm2, no date.

Vgexport.c, Sistina software, part of LVM2.2.01.15.tar, from ftp://sources.redhat.com/pub/lvm2, no date.

Vgimport.c, Sistana software, part of LVM2.2.01.15.tar, from ftp://sources.redhat.com/pub/lvm2, no date.

Vgcreate.c, Sistana software, part of LVM2.2.01.15.tar, from ftp://sources.redhat.com/pub/lvm2, no date.

Vgremove.c, Sistana software, part of LVM2.2.01.15.tar, from ftp://sources.redhat.com/pub/lvm2, no date.

Metadata.c, Sistana software, part of LVM2.2.01.15.tar, from ftp://sources.redhat.com/pub/lvm2, no date.

Metadata.h, Sistana software, part of LVM2.2.01.15.tar, from ftp://sources.redhat.com/pub/lvm2, no date.

Soltis S et al. "The Design and Performance of a Shared Disk File System for IRIX" NASA Goddard Space Flight Center Conference on Mass Storage and Technologies in Cooperation with the IEEE Symposium on Mass Storage Systems, Mar. 23 1998, pp. 1-17, XP002194621.

Hu Yoshida: "LUN Security Considerations for Storage Area Networks" Hitachi Data Systems, 1999, pp. 1-7, XP002185193.

* cited by examiner

|  | DISK 1 | DISK 2 | DISK 3 | |
|---|---|---|---|---|
| INITIAL STATE | <G, G> | <G, G> | <G, G> | |
| TP1 — STEP 1a | <U, G><br><U, U> | <U, G><br><U, U> | <U, G><br><U, U> | INTERMEDIATE STATE |
| — STEP 1b | <G, U><br><U, U> | <G, U><br><U, U> | <G, U><br><U, U> | INTERMEDIATE STATE |
| TP2 — STEP 2a | <U, R><br><R, R> | <U, R><br><R, R> | <U, R><br><R, R> | COMPLETED STATE |
| — STEP 2b | <R, U><br><R, R> | <R, U><br><R, R> | <R, U><br><R, R> | COMPLETED STATE |

FIG. 5

SYSTEM AND METHOD FOR TRANSFERRING VOLUME OWNERSHIP IN NETWORKED STORAGE

RELATED APPLICATIONS

This application is a continuation application of U.S. patent application Ser. No. 10/027,020, now issued as U.S. Pat. No. 7,296,068 on Nov. 13, 2007, entitled SYSTEM AND METHOD FOR TRANSFERRING VOLUME OWNERSHIP IN NET-WORKED STORAGE, by Joydeep sen Sarma et al.

This application is also related to the following U.S. patent applications:

Ser. No. 10/027,457, now issued as U.S. Pat. No. 7,650,412 on Jan. 19, 2010, entitled SYSTEM AND METHOD OF IMPLEMENTING DISK OWNERSHIP IN NETWORKED STORAGE, by Susan M. Coatney et al.

Ser. No. 10/027,330, now issued as U.S. Pat. No. 7,159,080 on Jan. 2, 2007, entitled SYSTEM AND METHOD FOR STORING STORAGE OPERATING SYSTEM DATA IN SWITCH PORTS, by Susan M. Coatney et al.

Ser. No. 10/027,013, now issued as U.S. Pat. No. 7,146,522 on Mar. 2, 2007, entitled SYSTEM AND METHOD FOR ALLOCATING SPARE DISKS IN NETWORKED STORAGE, by Alan L. Rowe et al.

FIELD OF THE INVENTION

The present invention relates to networked file servers, and more particularly to transferring volume ownership in networked file servers.

BACKGROUND OF THE INVENTION

A file server is a special purpose computer that provides file service relating to the organization of information on storage devices, such as disks. The file server or filer includes a storage operating system that implements a file system to logically organize the information as a hierarchical structure of directories and files on the disks. Each "on disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server. In this model, the client may comprise an application, such as a database application, executing on a computer that connects to the filer over a computer network. This computer network could be a point to point link, a shared local area network (LAN), a wide area network (WAN) or a virtual private network (VPN) implemented over a public network such as the Internet. Each client may request the services of the file system on the filer by issuing file system protocol messages (typically in the form of packets) to the filer over the network.

The disk storage typically implemented has one or more storage "volumes" comprised of a cluster of physical storage disks, defining an overall logical arrangement of storage space. Currently available filer implementations can serve a large number of discrete volumes (150 or more, for example). Each volume is generally associated with its own file system. The disks within a volume/file system are typically organized as one or more groups of Redundant Array of Independent (or Inexpensive) Disks (RAID). RAID implementations enhance the reliability and integrity of data storage through the redundant writing of data stripes across a given number of physical disks in the RAID group, and the appropriate caching of parity information with respect to the striped data. In the example of a WAFL based file system and process, a RAID 4 implementation is advantageously employed. This implementation specifically entails the striping of data across a group of disks, and separate parity caching within a selected disk of the RAID group.

Each filer "owns" the disks that comprise the volumes that the filer services. This ownership means that the filer is responsible for servicing the data contained on the disks. If the disks are connected to a switching network, for example a Fibre Channel switch, all of the filers connected to the switch are typically able to see, and read from, all of the disks connected to the switching network. However, only the filer that owns the disks can write to the disks. In effect, there is a "hard" partition between disks that are owned by separate filers that prevents a non-owner filer from writing to a disk.

This ownership information is stored in two locations. This ownership of disks is described in detail in U.S. patent application Ser. No. 10/027,457, issued as U.S. Pat. No. 7,650,412 on Jan. 19, 2010, ENTITLED SYSTEM AND METHOD OF IMPLEMENTING DISK OWNERSHIP IN NETWORKED STORAGE, which is hereby incorporated by reference. In the example of a WAFL based file system, each disk has a pre-determined sector that contains the definitive ownership information. This definitive ownership sector is called sector S. In an exemplary embodiment, sector S is sector zero of a disk. The second source of this ownership information is through the use of Small Computer System Interface (SCSI) level 3 reservations. These SCSI-3 reservations are described in *SCSI Primary Commands*-3, by Committee T10 of the National Committee for Information Technology Standards, which is incorporated fully herein by reference.

The combination of sector S and SCSI-3 reservation ownership information is often displayed in the following format <SECTORS, SCSI>, where SECTORS denotes the ownership information stored in sector S and SCSI is the current holder of the SCSI-3 reservation on that disk. Thus, as an example, if sector S and the SCSI-3 reservation of a disk both show that the disk is owned by a filer, arbitrarily termed "Green", that disks' ownership information could be denoted <G,G>, where "G" denotes Green. If one of the ownership attributes shows that the disk is un-owned, a U is used, i.e. <G,U> for a disk whose SCSI-3 reservations do not show any ownership.

The need often arises to transfer the ownership of a volume from one filer to another filer in a switch-connected network. This need can arise, when, for example, one filer becomes over-burdened because of the number of volumes it is currently serving. By being able to transfer ownership of a volume or a set of disks from one filer to another, filer load balancing can be accomplished. Currently, if a volume is to be transferred from one filer to another, the disks that comprise the volume need to be physically moved from one filer to another. Other ways of achieving filer load balancing would be the use of a distributed file system or a single file server containing multiple central processing units (CPUs) with each CPU being assigned a different set number of disks to manage. One disadvantage of a distributed file system (DFS) is that there is no switch zoning. In a DFS each node has to receive permission from all other nodes before accessing or writing data to a disk. This requesting of permissions introduces large amounts of computational overhead, thereby slowing system performance. A disadvantage of the single filer server with multiple CPUs is a lack of persistence. Each time the system comes on-line, each CPU may be assigned a different set of disks (with respect to a previous boot up) to manage. An additional disadvantage of a single file server with multiple CPUs is a limit as to scalability.

Accordingly, it is an object of the present invention to provide a system and method for transferring ownership of a volume in a networked storage arrangement. The system and method should be atomic (i.e., all disks are transferred, or none of the disks are transferred), and maintain the consistency of the disks.

SUMMARY OF THE INVENTION

This invention overcomes the disadvantages of the prior art by providing a system and method for transferring volume ownership from one filer to another filer without the need for physically moving the disks comprising the volume. A two-part transfer process for transferring volume ownership is employed, with various embodiments for logging or for when a filer is not active.

According to one embodiment, the source filer modifies the two ownership attributes from a source-owned state to a completely un-owned state. The destination filer then modifies the un-owned disks' ownership attributes to a destination-owned state.

In another illustrative embodiment, both the destination and source filers maintain log files that are updated after each step in the transfer process. If the transfer process is interrupted by, for example, one of the filers becoming inactive, the logs can be utilized to continue the process when both filers are active.

In another embodiment, if the filer that currently owns the volume is not active, the destination filer first transfers the disks from the source-owned state to an un-owned state. The destination filer then transfers the disks from the un-owned state to a destination-owned state.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 5 is a block diagram of the various steps of the transfer process in accordance with an embodiment of this invention;

DETAILED DESCRIPTION OF ILLUSTRATIVE EMBODIMENTS

A. Network Environment

Figure 1:
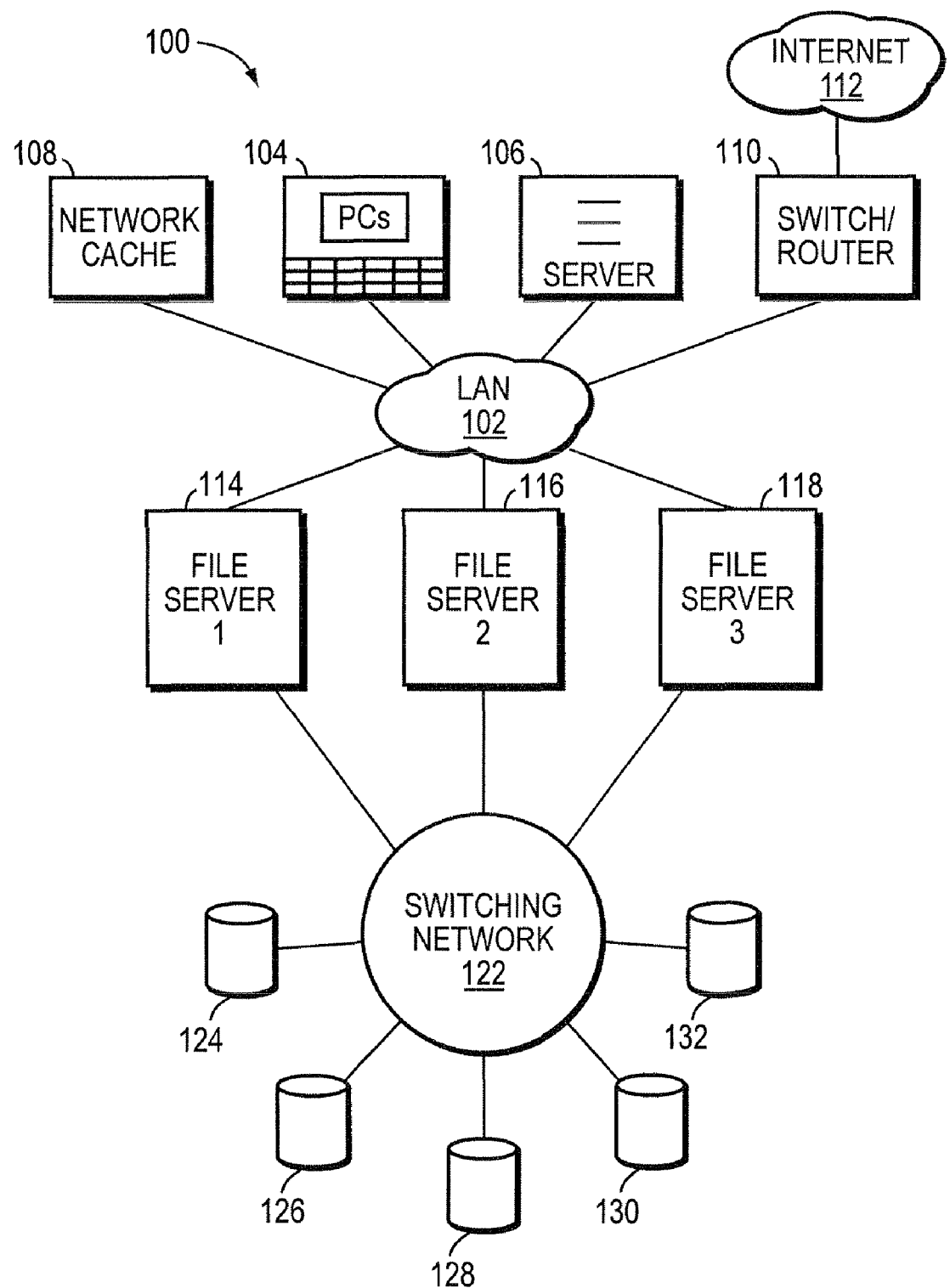
FIG. 1 is a schematic block diagram of a network environment including various network devices including exemplary file servers having filers and associated volumes.

FIG. 1 is a schematic block diagram of an exemplary network environment 100 in which the principles of the present invention are implemented. The network 100 is based around a local area network (LAN) 102 interconnection. However, a wide area network (WAN), virtual private network (VPN) (utilizing communication links over the Internet, for example), or a combination of LAN, WAN and VPN implementations can be established. For the purposes of this description the term LAN should be taken broadly to include any acceptable networking architecture. The LAN interconnects various clients based upon personal computers 104, servers 106 and a network cache 108. Also inter-connected to the LAN may be a switch/router 110 that provides a gateway to the well known Internet 112 thereby enabling various network devices to transmit and receive Internet based information, including e-mail, web content, and the alike.

Exemplary file servers 114, 116 and 118 are connected to the LAN 102. These file servers, described further below, are configured to control storage of, and access to, data in a set of interconnected storage volumes. As described further below, each file server is typically organized to include one or more RAID groups of physical storage disks for increased data storage integrity and reliability. Each of the devices attached to the LAN include an appropriate conventional network interface arrangement (not shown) for communicating over the LAN using desired communication protocols such as the well known Transport Control Protocol/Internet Protocol (TCP/IP), User Datagram Protocol (UDP), Hypertext Transfer Protocol (HTTP), or Simple Network Management Protocol (SNMP).

The file servers are also connected to a switching network 122 utilizing an appropriate form of switching technology. For example, the switching network can be a Fibre Channel link. It is expressly contemplated that other forms of switching networks can be utilized in accordance with this invention. A plurality of physical disks 124, 126, 128, 130 and 132, which comprise the volumes served by the filers are also attached to the switching network 122. Thus, any file server can access any disk connected to the switching network.

B. File Servers

Figure 2:
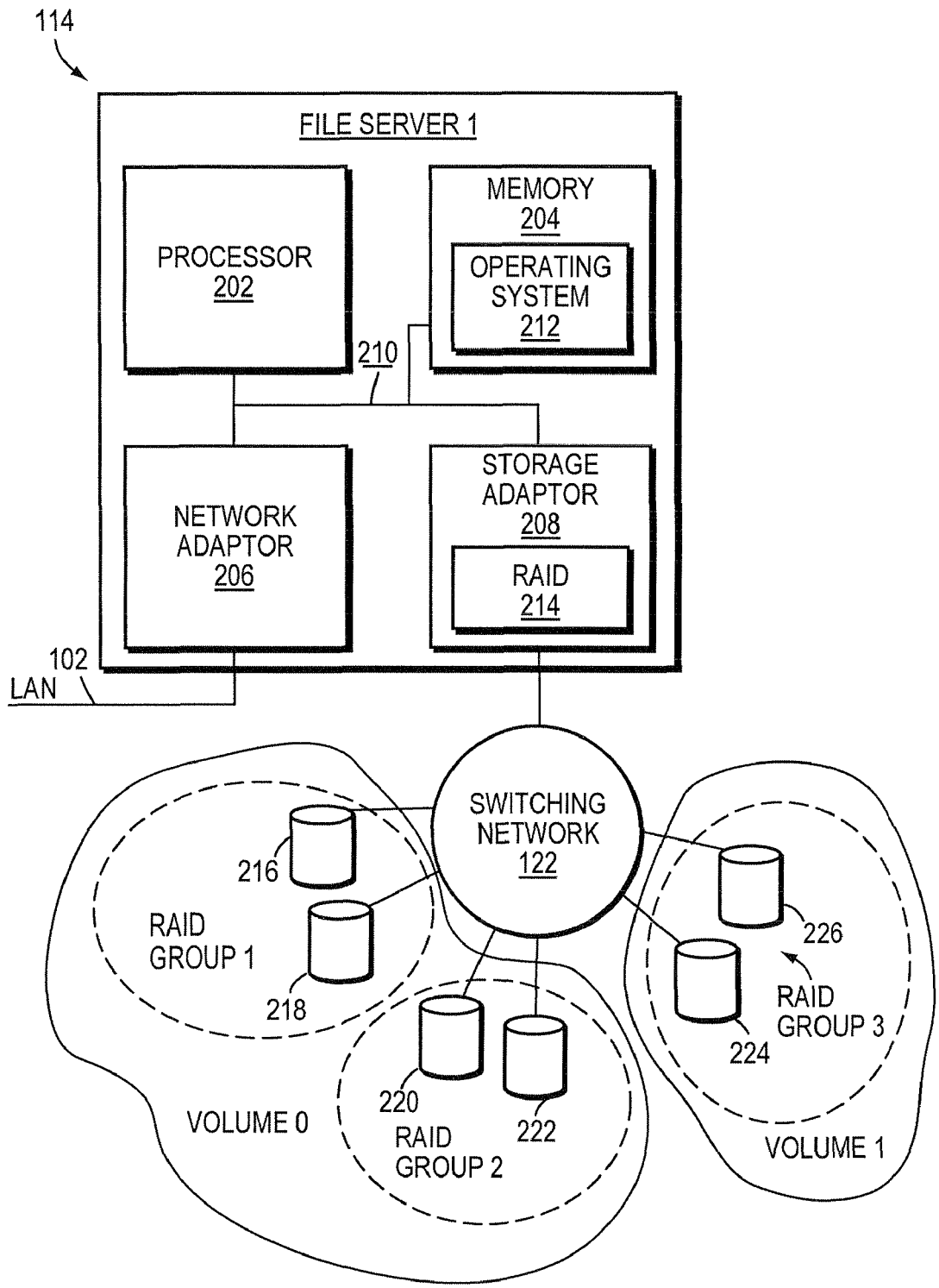
FIG. 2 is more-detailed schematic block diagram of an exemplary file server in accordance with FIG. 1.

FIG. 2 is a more-detailed schematic block diagram of the exemplary file server 114, implemented as a network storage appliance, such as a NetApp® filer available from Network Appliance, that is advantageously used with the present invention. Other filers can have similar construction (including filers 116 and 118). By way of background, a file server, embodied by a filer, is a computer that provides file service relating to the organization of information on storage devices, such as disks. However, it will be understood by those skilled in the art by the inventive concepts described herein may apply to any type of filer, whether implemented as a special-purpose or general-purpose computer, including a stand alone computer. The filer comprises a processor 202, a memory 204, a network adapter 206 and a storage adapter 208 interconnected by a system bus 210. The filer also includes a storage operating system 212 that implements a file system to logically organize the information as a hierarchical structure of directories and files on the disks.

In the illustrative embodiment, the memory 204 may have storage locations that are addressable by the processor and adapters for storing software program code or data structures associated with the present invention. The processor and adapters may, in turn, comprise processing elements and/or logic circuitry configured to execute the software code and manipulate the data structures. The storage operating system 212, portions of which are typically resident in memory and executed by the processing elements, functionally organize a file server by inter-alia invoking storage operations in support of a file service implemented by the file server. It will be apparent to those skilled in the art that other processing and memory implementations, including various computer-readable media, may be used for storing and executing program instructions pertaining to the inventive technique described herein.

The network adapter 206 comprises the mechanical, electrical and signaling circuitry needed to connect the file server to a client over the computer network, which as described generally above can comprise a point-to-point connection or a shared medium such as a local area network. A client can be a general purpose computer configured to execute applications including file system protocols, such as the Common Internet File System (CIFS) protocol. Moreover, the client can interact with the file server in accordance with the client/server model of information delivery. The storage adapter cooperates with the storage operating system 212 executing in the file server to access information requested by the client. The information may be stored in a number of storage volumes (Volume 0 and Volume 1), each constructed from an array of physical disks that are organized as RAID groups (RAID GROUPs 1, 2 and 3). The RAID groups include independent physical disks including those storing a striped data and those storing separate parity data (RAID 4). In accordance with a preferred embodiment RAID 4 is used. However, other configurations (e.g., RAID 5) are also contemplated.

The storage adapter 208 includes input/output interface circuitry that couples to the disks over an I/O interconnect arrangement such as a conventional high-speed/high-performance fibre channel serial link topology. The information is retrieved by the storage adapter, and if necessary, processed by the processor (or the adapter itself) prior to being forwarded over the system bus to the network adapter, where the information is formatted into a packet and returned to the client.

To facilitate access to the disks, the storage operating system implements a file system that logically organizes the information as a hierarchical structure of directories in files on the disks. Each on-disk file may be implemented as a set of disk blocks configured to store information such as text, whereas the directory may be implemented as a specially formatted file in which other files and directories are stored. In the illustrative embodiment described herein, the storage operating system associated with each volume is preferably the NetApp® Data ONTAP operating system available from Network Appliance, Inc. of Sunnyvale, Calif. that implements a Write Anywhere File Layout (WAFL) file system. The preferred storage operating system for the exemplary file server is now described briefly. However, it is expressly contemplated that the principles of this invention can be implemented using a variety of alternate storage operating system architectures.

C. Storage Operating System

Figure 3:
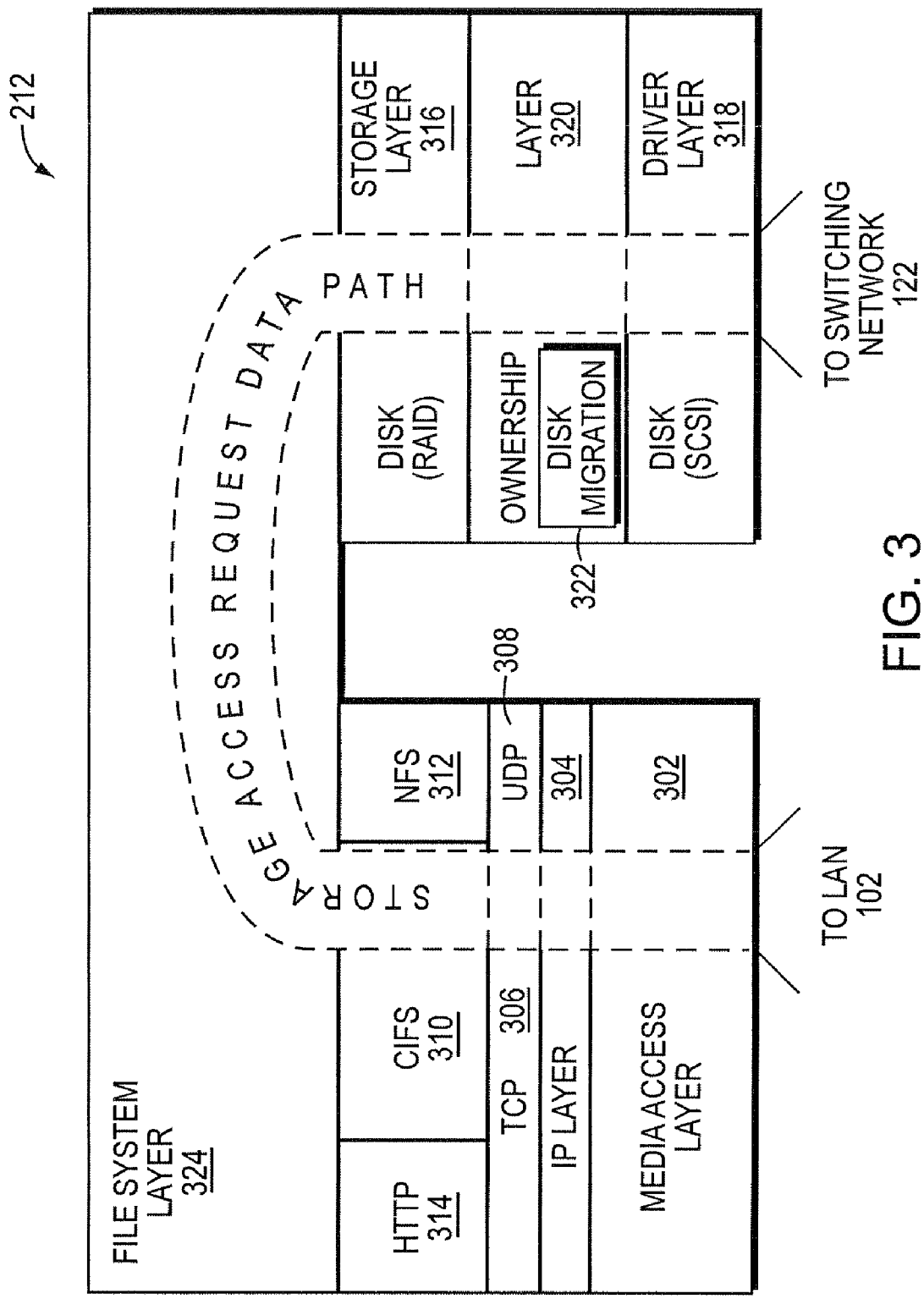
FIG. 3 is a schematic block diagram of a storage operating system for use with the exemplary file server of FIG. 2 according to an embodiment of this invention.

As shown in FIG. 3, the storage operating system 212 comprises a series of software layers including a media access layer 302 of network drivers (e.g., an Ethernet driver). The storage operating system further includes network protocol layers such as the IP layer 304 and its TCP layer 306 and a UDP layer 308. A file system protocol layer provides multi-protocol data access and, to that end, includes support from the CIFS protocol 310, the Network File System (NFS) protocol 312 and the HTTP protocol 314.

In addition, the storage operating system 212 includes a disk storage layer 316 that implements a disk storage protocol such as a RAID protocol, and a disk driver layer 318 that implements a disk access protocol such as e.g., a Small Computer System Interface (SCSI) protocol. Included within the disk storage layer 316 is a disk ownership layer 320, which manages the ownership of the disks to their related volumes. A disk migration level 322 is a subset of the disk ownership level 320. Notably, the disk migration level 322 works to change on-disk reservations and sector S ownership information.

Bridging the disk software layers with the network and file system protocol layers is a file system layer 324 of the storage operating system. Generally, the file system layer 324 implements the WAFL file system having an on-disk file format representation that is a block based. The WAFL file system generated operations to load/retrieve the requested data of volumes if it not resident "in core," i.e., in the file server's memory. If the information is not in memory, the file system layer indexes into the inode file using the inode number to access an appropriate entry and retrieve a logical block number. The file system layer then passes the logical volume block number to the disk storage/RAID layer, which maps out logical number to a disk block number and sends the later to an appropriate driver of a disk driver layer. The disk driver accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" through the storage operating system layers described above needed to perform data storage access for the client received the file server may ultimately be implemented in hardware, software or a combination of hardware and software (firmware, for example).

Figure 4:
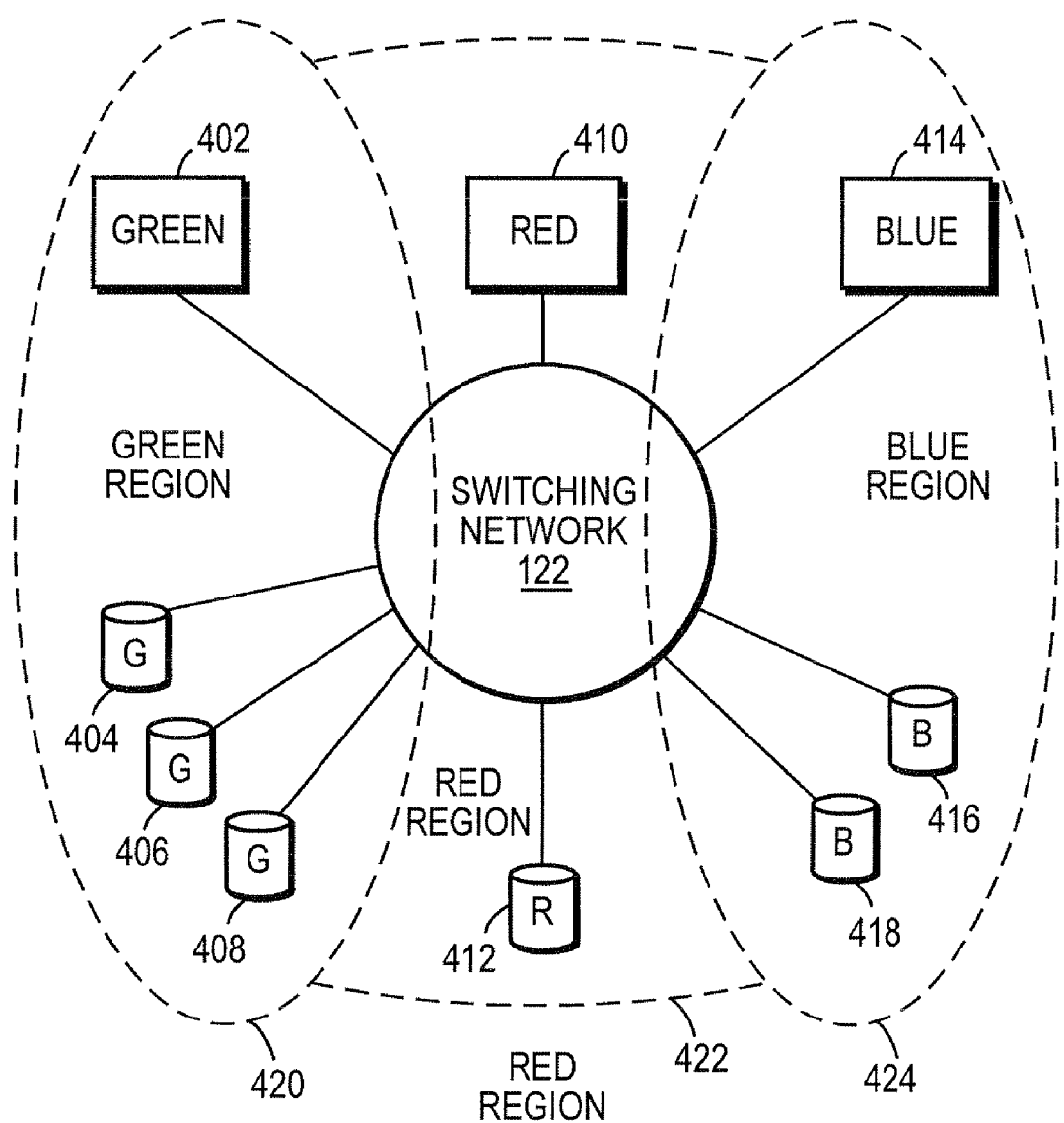
FIG. 4 is a schematic block diagram of a network environment including exemplary filers and disks connected to a switching network.

FIG. 4 is a schematic block diagram showing an illustrative switching network 400 with file servers and disks attached thereto. In this exemplary configuration there is a "green" file server 402 which owns green (G) disks 404, 406, and 408. Red file server 410 owns red (R) disk 412. The blue file server 414 owns the blue (B) disks 416 and 418. Each set of disks is allocated to a particular region. The regions are defined as the set of disks that a particular file server owns. For example, the green file server 402 has exclusive write access to the green disks 404, 406, and 408. Red file server 410 may read data from the green disks 404, 406, and 408, but may not write therein.

This write protection is generated by the use of data written on each disk's sector S and through SCSI-3 reservations. In the illustrative embodiment, the data written on sector S is the definitive ownership data for a particular disk. The SCSI-3 reservations are generated via the SCSI protocol as previously described.

D. Volume Transfer

FIG. 5 shows the steps of the transfer process in accordance with this invention. In this example, Disks 1, 2 and 3 are currently owned by the Green file server and are to be transferred to the Red file server. The initial state shows disks 1, 2 and 3 owned by the green file server. Both the sector S data and the SCSI-3 reservations are labeled as green (i.e. <G,G>). Step one of the transfer process (TP1) is to convert the disks from the initial state into a completely un-owned (U) stage (<U,U>). There are two variants of step one. In step 1*a*, the sector S information is modified to an un-owned state (<U, G>) and then the SCSI-3 reservations are changed to the un-owned state, resulting in <U,U>. Step 1*b* involves first changing the SCSI-3 reservations to an un-owned state (<G, U>). The second part of step 1*b* is changing the sector S data to an un-owned state. At the end of step 1*a* or 1*b* the disks will be completely un-owned, i.e. <U,U> and at the intermediate step.

Step 2 of a transfer process (TP2) involves modifying the disks from the intermediate state <U,U> to a state signifying their ownership by the red file server <R,R>. There are also two alternate methods of performing step 2 of the transfer process. Step 2*a* involves first writing the SCSI reservation data to the disks (<U,R>) and then writing the sector S data. Step 2*b* involves first writing the sector S data (<R,U>) and then writing the SCSI reservation data to the disks. At the end of either step 2*a* or 2*b*, the result will be a disk completely owned by the red file server (<R,R>). When the disks are in a <R,R> state the transfer process has completed the transfer of ownership.

In addition to marking the sector S area as un-owned, the transfer process may also annotate the disk. This annotation can, in one embodiment, be stored in sector S. The annotation can include the volume name that the disk belongs to and the names of the source and destination filers that are participating in the movement of the volume. An annotation permits an un-owned disk to be distinguished from other un-owned disks in a networked storage system.

Figure 6:
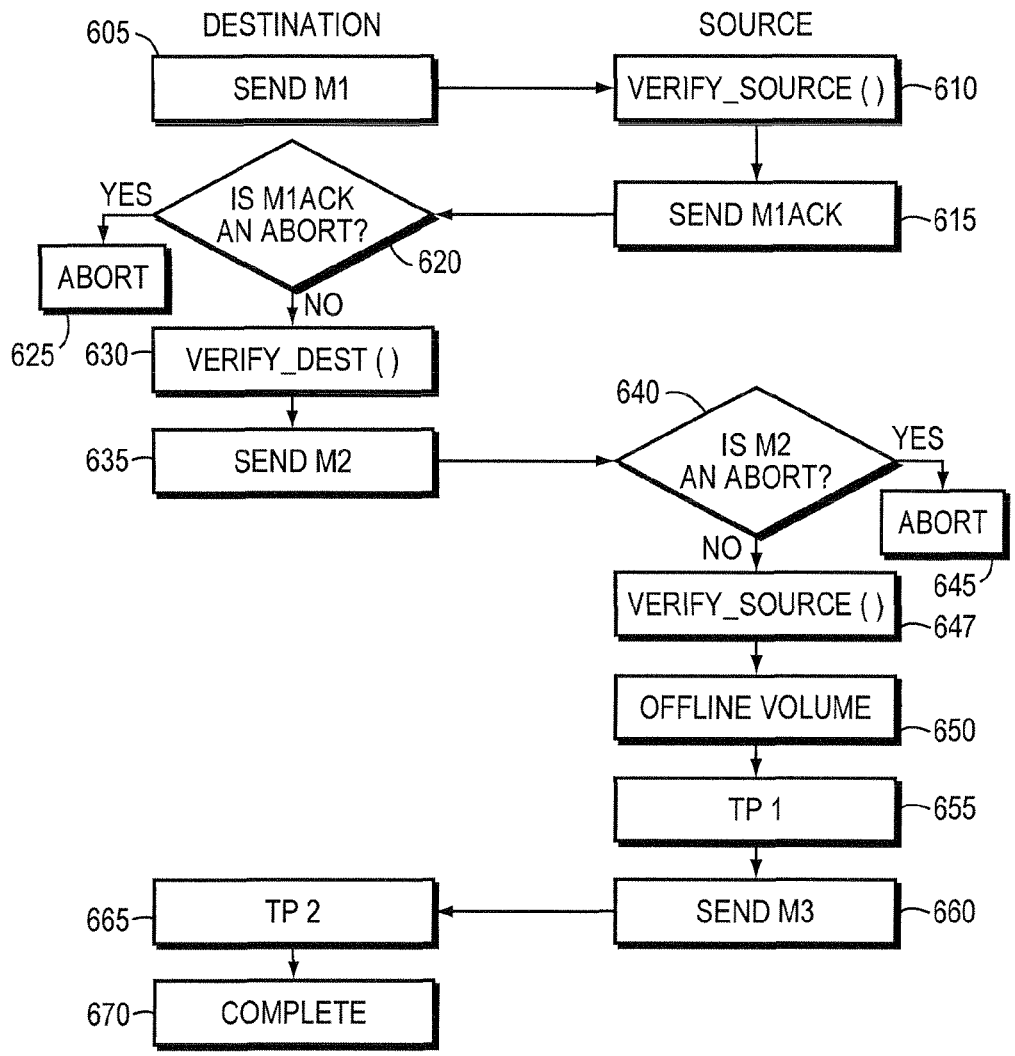
FIG. 6 is a flow chart detailing the steps of the transfer process when the source filer is alive.

FIG. 6 is a flow chart showing the steps of the transfer process performed by both the destination file server and the source file server if the source file server is alive. In step 605, the destination file server sends Message 1 (M1) to the source file server. M1 contains an initial request for transferring a specific volume. In response to M1, the source file server calls the function Verify_Source( ) (step 610) to see if the source file server can release the volume about that has been requested to be migrated. For example, if the volume requested is a root volume for the file server it cannot be migrated.

The source file server then sends, in step 615, Message 1 Acknowledgement (M1ack), which contains the list of disks in the volume and other required information if the volume can be transferred. If the volume cannot be transferred M1ack will be an abort message. The destination file server checks M1ack at step 620 to see if it contains an abort message. If an abort message is found, the destination file server aborts the transfer at step 625. If M1ack is not an abort message, the destination file server calls the Verify_Dest( ) function (step 630) to verify that a destination file server can acquire the volume requested. For example, the destination file server must have all required licenses associated with the volume to be transferred.

If the destination file server can accept the volume to be transferred, it sends Message 2 (M2) to the source file server at step 635. If the destination file server cannot accept the volume to be migrated, M2 contains an abort message. The source file server verifies the contents of M2 (step 640). If it is an abort message the file server aborts the transfer as in step 645. Otherwise, the source filer calls the Verify_Source( ) function (step 647) to determine if the volume is still eligible to be released. The source file server will off-line the volume to be transferred at step 650. In accordance with step 655, the source file server will conduct step one from the transfer process. As the source file server is alive, it is preferable that step 1*a* be utilized as the first step of the transfer process (TP1). After the completion of TP1, the source file server sends an acknowledgement Message 3 (M3) to the destination file server (step 660). The destination file server upon a receipt of M3 performs step 2 from the transfer process (TP2) at step 665. After the completion of TP2, the transfer is complete (step 670) and the destination file server may attempt to bring the volume on-line.

Figure 7:
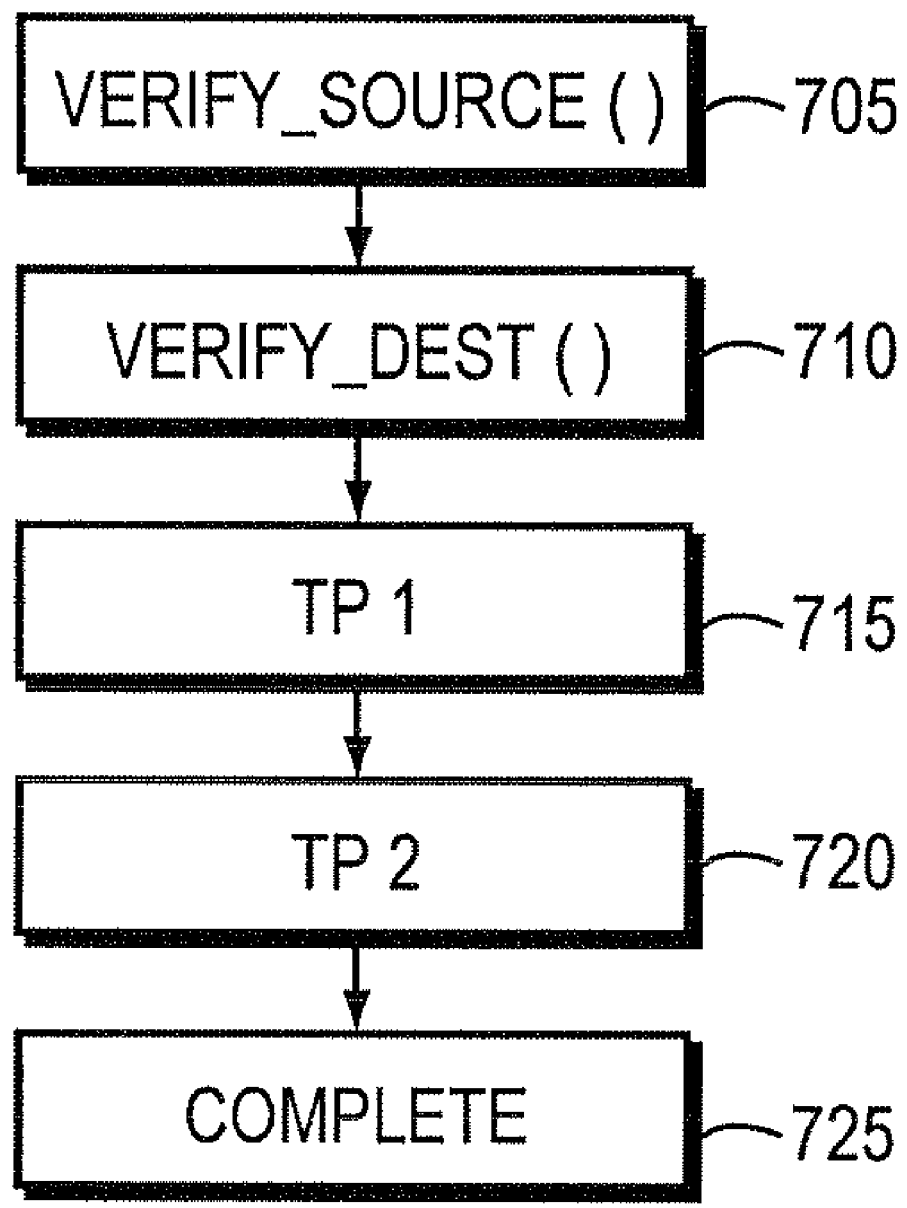
FIG. 7 is a flow chart of the transfer process when the source filer is not alive.

FIG. 7 is a flow chart of the steps performed by the destination file server if there is no response to M1. If there is no response to M1, it is assumed that the source file server is dead. In step 705, the destination file server calls the Verify_Source( ) function to verify that the volume can be transferred. The destination file server then calls the Verify_Dest( ) function (step 710) to ensure that it has appropriate licenses, permissions or other required aspects. The file server then performs step one of the transfer process (TP1) in step 715. As the source file server is not alive the destination file server uses step 1*b* of the transfer process by first changing the reservations and then writing new ownership information to sector S. Upon the completion of TP1, at step 720, the destination file server then performs step 2 of the transfer process (TP2). The volume has completed its transfer upon the completion of TP2 (725).

Figure 8:
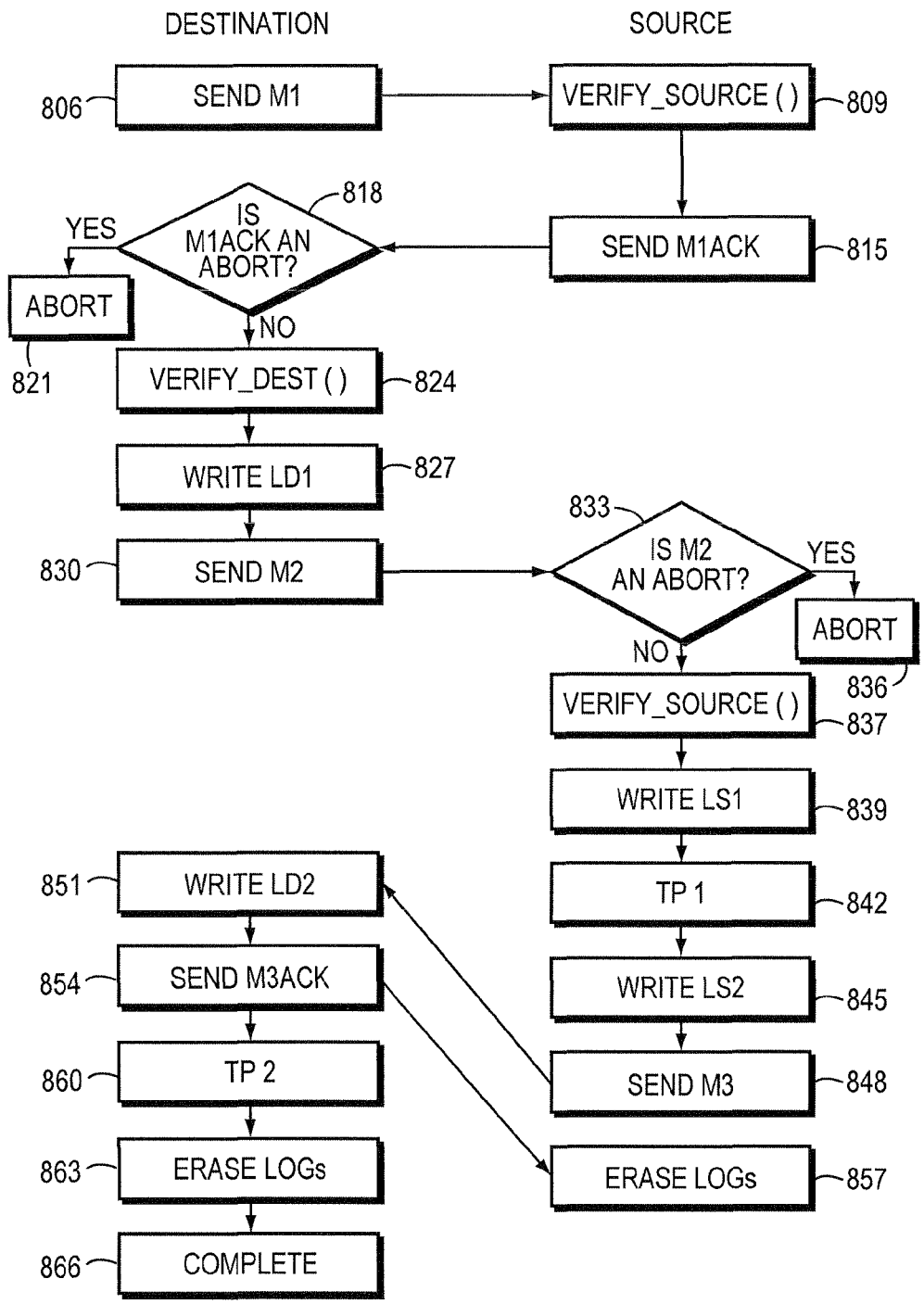
FIG. 8 is a flow chart of the transfer process including logging when the source filer is alive.

FIG. 8 is a flow chart detailing the steps that the source and destination file servers will perform when the logging transfer process is used and the source file server is alive. The destination file server commences the transfer sending message M1 (step 806) to the source file server. Message M1 contains the name of the volume to be transferred. Upon receiving M1 the source file server performs Verify_Source( ) (step 809) to determine whether the volume can be transferred. If the volume can be transferred, the source file server, at step 815, sends M1ack which contains a positive acknowledgement. If Verify_Source( ) fails, an abort message is encapsulated in M1ack. The destination file server then verifies the contents of M1ack in step 818. If M1ack contains an abort indicator, the transfer is aborted in accordance with step 821. Otherwise, upon receipt of M1ack, the destination file server moves to step 824 and performs Verify_Dest( ) to determine whether the volume should be transferred. If the check succeeds, the destination file server records destination log record one (LD1) at step 827 and then moves to step 830 where it sends M2 to the source file server asking the source file server to initiate the transfer. If Verify_Dest( ) fails then M2 contains an abort indicator.

Upon receipt of a positive confirmation in M2, the source file server re-executes the Verify_Source( ) function (step 837). If the disks are still eligible to be transferred, the source file server then writes a first source log record (LS1) noting the start of the transfer at step 839. The source file server then performs step one of the transfer process (TP1) at step 842. As the source file server is alive, it is preferable that step 1*a* be used as TP1. Upon completion of TP1, the source file server commits a second source log record (LS2) (step 845) and then sends message M3 at step 848 to the destination file server notifying the destination file server of the completion of the source side transfer. When the destination file server receives M3 it commits a second destination log record (LD2) at step 851 noting the destination file server's receipt and then sends the source file server an acknowledgement through M3*ack* (step 854). The destination file server moves to step 860 and performs step two of the transfer process (TP2). After completion of TP2, at step 863, the destination file server erases its log entry for this transaction, thereby completing (step 866) the transfer. When the source file server receives M3*ack*, it erases its log entry for the transaction at step 857. It should be noted that steps 857 and 860-866 can occur concurrently.

This logging protocol does not assume a reliable transfer process. This implies messages can be dropped due to a network or recipient problem, and therefore messages must be retransmitted under time outs in certain states. The log records at each node denote its state in the transfer process. State changes occur, and new log records are written, when messages are received. The table below tabulates the states of the nodes against possible events and lists the appropriate response in each case.

TABLE 1

| | Event | | | | | |
|---|---|---|---|---|---|---|
| State | Timeout | M1 | M1ack | M2 | M3 | M3ack |
| LD1 | Retransmit M2 | X | X | X | Move to LD2 | X |
| LD2 | Ignore | X | X | X | Retransmit M3ack | X |
| LS1 | Ignore | X | X | Ignore | X | X |
| LS2 | Retransmit M3 | X | X | Retransmit M3 | X | Move to Default |
| Default | Ignore | Source_Chk Send M1ack | Destination_Chk. Send M2 if successful. | Move to LS1 state. | Retransmit M3ack with error | Ignore |

If the file server determines, while initializing, that it is in the process of a part of the transfer process, it then completes the remaining steps. There are several special rules applying to the continuation of the transfer process. If the destination file server reboots and detects a log entry LD3, the destination file server repeats step 2 from the transfer process and then erases the log entry. If a source filer reboots and detects a log entry LS2, it repeats transfer process step 1 and then commits log entry LS3 and then continues on with the process as previously described. As was stated before, these steps should be performed before the final list of owned disks is arrived at and passed on to RAID 4 for assimilation. Subsequent to booting, the file server should check the presence of any log entries corresponding to this protocol and assume the states implied by them and start any timers as required. A recovery from a failure during the process of the transfer process will automatically occur by following the rules in the state table above.

Figure 9:
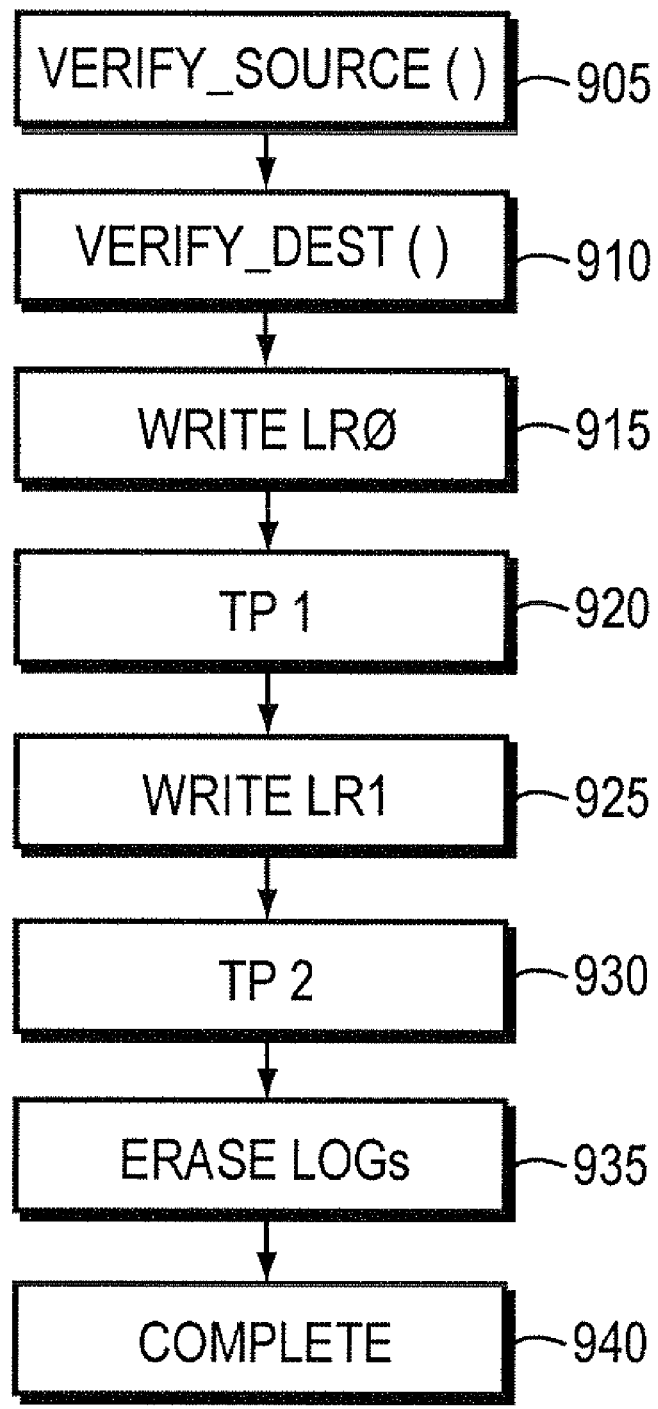
FIG. 9 is a flow chart of the transfer process including logging when the source filer is not alive.

FIG. 9 is a flow chart detailing the steps that the destination file server performs by using a logging transfer process when the source file server is not alive. The destination file server first calls the Verify_Source( ) function (step 905) and then Verify_Dest( ) (step 910) to ensure that the volume can be transferred. Then at step 915, the destination file servers commits log record LR0 marking the beginning of the logged transfer process from a dead file server along with a list of disks being transferred. At step 920 the file server executes TP1. As the source file server is dead, it will execute step 1*b*. Upon completion of step one, the transfer process the destination file server moves to step 925 and commits log record LR1. The file server then executes TP2 at step 930. Upon completion of the TP2, the file server completely erases the log record at step 935 at which point (step 940) the transfer is complete.

If the destination file server fails at a given point in the middle of this operation, it will determine from the presence of log records what the status of the ongoing operation was the next time it boots. There are three possible scenarios from the destination file server reboots:

1. No log record is found;

2. Log record LR0 is found;

3. Log record LR1 is found.

If no log record is found, nothing needs to be done as no disk ownership information has been modified. If log record LR0 is found, then the file server needs to execute step one of the transfer process commit log record LR1 and then execute step two of the protocol. If log record LR1 is found, then the destination file server needs to execute step two from the protocol and the erase the log record upon completion. As described above, these recovery actions should be performed as part of the boot process preferably before RAID initializes to infer accurately the set of disks that the file server is suppose to own.

Figure 10:
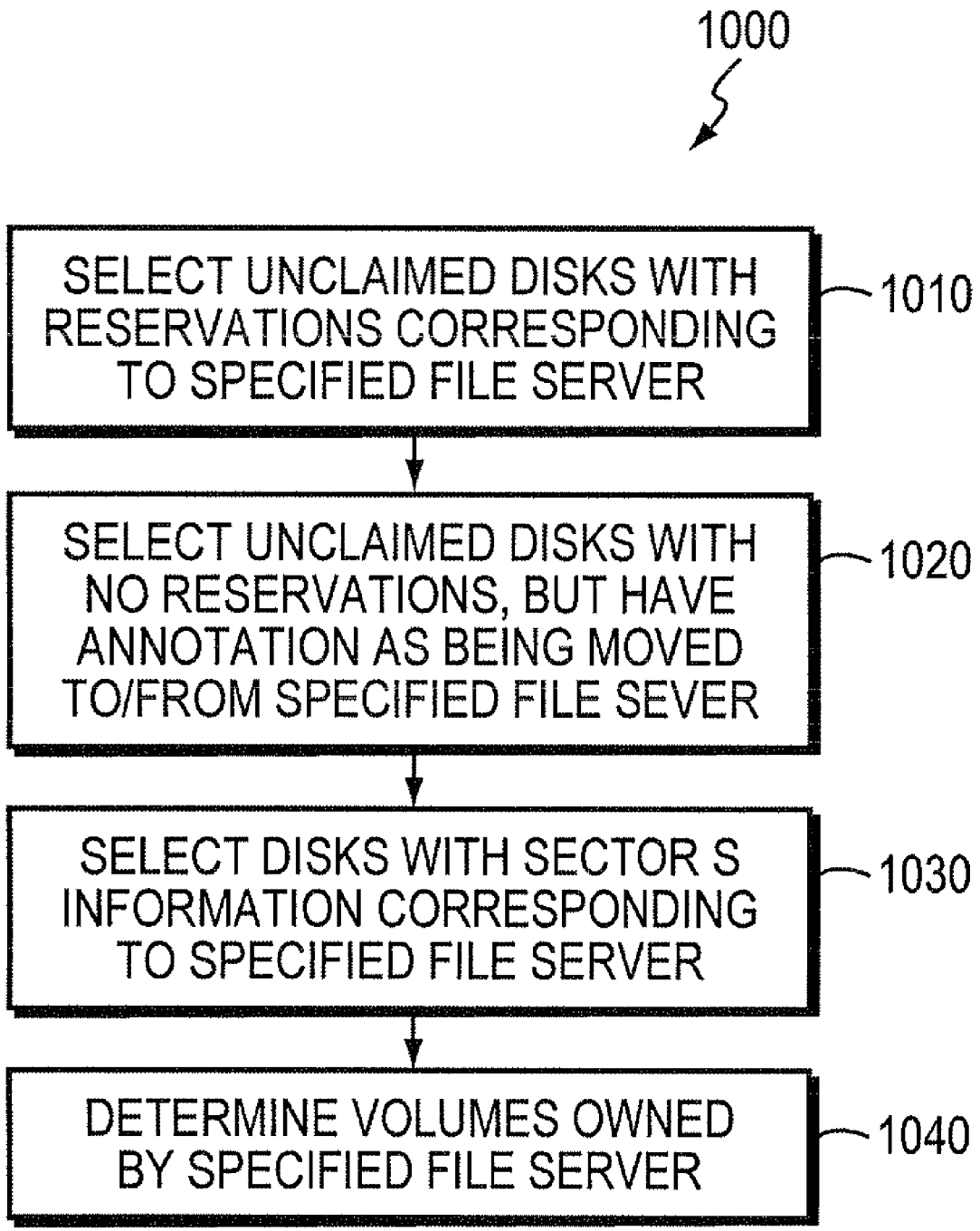
FIG. 10 is a flow chart of the steps of the Repair( ) process.

The use of the logging protocols ensures atomicity in those cases where a filer crashes during the transfer but then later recovers. However, if the crashed filer never recovers, atomicity is not guaranteed. To ensure atomicity in those cases, a separate procedure should be called. This procedure, arbitrarily called Repair( ), takes a filer's identification as a parameter and returns a list of volumes that are completely or partially owned by that filer. FIG. 10 is a flow chart detailing the steps of an exemplary Repair( ) function. It should be noted that other methods of performing this function are expressly contemplated.

The Repair( ) function first selects all unclaimed disks that have a reservation set to the specified filer (step 1010). For example, if Filer A was the desired filer, all disks of the form <X,A> would be selected, where X can be any designation. Next, in step 1020, the function selects all unclaimed disks that have no reservation, but have an annotation identifying that disk as one being moved to or from the specified filer. Then, the function selects all disks whose sector S information identifies the disk's owner as the specified file server (step 1030). Finally, in step 1040, the Repair( ) function determines all volumes that are partially or completely owned by the specified file server.

This determination made in step 1040 is the result of the function running a RAID assimilation algorithm over the pool of disks. The RAID assimilation algorithm organizes the disks into a set of logical units that can be utilized by both the file system and RAID. In an illustrative WAFL-based file system, the assimilation process organizes the disks into RAID groups, volumes and mirrors (if mirroring is active). The assimilation routine will generate a listing of volumes that are partially owned by a specified file server and partially unowned. This information can then be output to the administrator for use in determining whether volumes should be moved from a dead filer.

As an example, assume that Filer A is dead. The system administrator executes Repair( ) with Filer A as a parameter. If the function returns the information that volume X is partially owned by Filer A, the administrator may want to move (using TP_D or L_TP_D) volume X to filer that is alive.

The foregoing has been a detailed description of the invention. Various modifications and additions can be made without departing from the spirit and scope of this invention. Furthermore, it expressly contemplated that the processes shown and described according to this invention can be implemented as software, consisting of a computer-readable medium including program instructions executing on a computer, as hardware or firmware using state machines and the alike, or as a combination of hardware, software and firmware. Accordingly, this description is meant to be taken only by way of example and not to otherwise limit the scope of this invention.

What is claimed is:

1. A method for operating a data storage system, comprising:
    indicating by a first indicia of ownership and by a second indicia of ownership that a selected storage system of a plurality of storage systems has ownership of a logical arrangement of storage space, and the two indicia of ownership are required to agree for the selected storage system to have ownership of the logical arrangement of storage space;
    issuing a request that ownership of the logical arrangement of storage space owned by a first storage system of the plurality of storage systems be transferred to a second storage system of the plurality of storage systems;
    changing, in response to the request, a first ownership attribute to a state of unowned;
    changing, in response to the request, a second ownership attribute to a state of unowned;
    changing, in response to the first ownership attribute and the second ownership attribute both being in the state of unowned, the first ownership attribute and the second ownership attribute to indicate that the second storage system is the owner of the logical arrangement of storage space; and
    maintaining a log of changes of the first ownership attribute and the second ownership attribute, the log written into persistent storage, the log permitting the request for ownership to continue in the event that either the first storage system or the second storage system becomes inoperative before the change in ownership is completed.

2. The method as in claim 1, further comprising:
    including two independent ownership attributes in the ownership attributes.

3. The method as in claim 1, further comprising:
    including a small computer interface (SCSI) reservation as an ownership attribute.

4. The method as in claim 1, further comprising:
    including an ownership sector on a disk as an ownership attribute.

5. The method as in claim 1, further comprising:
    including a storage disk in the logical arrangement of storage space.

6. The method as in claim 1, further comprising:
    including a volume of a plurality of storage disks in the logical arrangement of storage space.

7. The method as in claim 1, further comprising:
    writing the ownership attributes to persistent storage.

8. The method as in claim 1, further comprising:
    writing the ownership attribute to a disk.

9. A method for operating a data storage system, the method comprising:
    indicating by a plurality of ownership attributes that a selected storage system of a plurality of storage systems has ownership of a logical arrangement of storage space, and the plurality of ownership are required to agree for the selected storage system to have ownership of the logical arrangement storage space;
    issuing a request that ownership of a logical arrangement of storage space owned by a first storage system be transferred to a second storage system;
    changing, in response to the request, a plurality of ownership attributes of the logical arrangement of storage space previously indicating ownership by the first storage system to a new set of attributes indicating that the logical arrangement of storage space is unowned;
    after the new set of attributes indicates that the logical arrangement of storage space is unowned, changing the new set of attributes to indicate that the second storage system owns the logical arrangement of storage space; and
    maintaining a log of changes of the plurality of ownership attributes, the log written into persistent storage, the log permitting the request for ownership to continue in the event that either the first storage system or the second storage system becomes inoperative before the change in ownership is completed.

10. A data storage system, comprising:
    a plurality of ownership attributes that a selected storage system of a plurality of storage systems has ownership of a logical arrangement of storage space, and the plurality of ownership attributes are required to agree for the selected storage system to have ownership of the logical arrangement storage space;
    a request that ownership of a logical arrangement of storage space owned by a first storage system be transferred to a second storage system;
    a process to change, in response to the request, a plurality of ownership attributes to a state of unowned;
    after the of plurality of ownership attributes indicates that the logical arrangement of storage space is unowned, the process to change the plurality of ownership attributes of the logical arrangement of storage space to a new state indicating that the second storage system is the owner of the logical arrangement of storage space; and
    a log of changes of the plurality of ownership attributes, the log written into persistent storage, the log permitting the request for ownership to continue in the event that either the first storage system of the second storage system become inoperative before the change in ownership is completed.

11. The data storage system as in claim 10, further comprising:
    two independent indicia of ownership included in the ownership attributes.

12. The data storage system as in claim 10, further comprising:
    a small computer interface (SCSI) reservation included in the ownership attributes.

13. The data storage system as in claim 10, further comprising:
    an ownership sector on a disk included in the ownership attributes.

14. The data storage system as in claim 10, further comprising:
   a storage disk included in the logical arrangement of storage space.

15. The data storage system as in claim 10, further comprising:
   a volume of a plurality of storage disks included in the logical arrangement of storage space.

16. The data storage system as in claim 10, further comprising:
   the ownership attributes written to persistent storage.

17. The data storage system as in claim 10, further comprising:
   the ownership attributes written to a disk.

18. A data storage system, comprising:
   a plurality of ownership attributes to indicate that a selected storage system of a plurality of storage systems has ownership of a logical arrangement of storage space, and the plurality of ownership attributes are required to agree for the selected storage system to have ownership of the logical arrangement storage space; a request that ownership of a logical arrangement of storage space owned by a first storage system be transferred to a second storage system;
      a process to change, in response to the request, a plurality of ownership attributes of the logical arrangement of storage space to a state of unowned;
      after the plurality of ownership attributes indicates that the logical arrangement of storage space is unowned, a computer to transfer the plurality of ownership attributes of the logical arrangement of storage space previously indicating ownership by the first storage system to indicate that the logical arrangement of storage space is unowned;
      after the plurality of ownership attributes indicates that the logical arrangement of storage space is unowned, the process to change the plurality of ownership attributes of the logical arrangement of storage space indicates that the second storage system owns the logical arrangement of storage space; and
      a log of changes of the plurality of ownership attributes, the log written into persistent storage, the log permitting the request for ownership to continue in the event that either the first storage system or the second storage system becomes inoperative before the change in ownership is completed.

19. A non-transitory computer readable media having instructions stored thereon for execution on a processor for a method of operating a data storage system, the method having,
   indicating by a first indicia of ownership and by a second indicia of ownership that a selected storage system of a plurality of storage systems has ownership of a logical arrangement of storage space, and the two indicia of ownership are required to agree for the selected storage system to have ownership of the logical arrangement of storage space;
   issuing a request that ownership of a logical arrangement of storage space owned by a first storage system be transferred to a second storage system;
   changing, in response to the request, a first ownership attribute to a state of unowned;
   changing, in response to the request, a second ownership attribute to a state of unowned; changing, in response to the first ownership attribute and the second ownership attribute both being in the state of unowned, the first ownership attribute and the second ownership attribute to indicate that the second storage system is the owner of the logical arrangement of storage space; and
   maintaining a log of changes of the first ownership attribute and the second ownership attribute, the log written into persistent storage, the log permitting the request for ownership to continue in the event that either the first storage system or the second storage system becomes inoperative before the change in ownership is completed.

* * * * *

UNITED STATES PATENT AND TRADEMARK OFFICE
CERTIFICATE OF CORRECTION

PATENT NO. : 7,788,361 B2  
APPLICATION NO. : 11/867130  
DATED : August 31, 2010  
INVENTOR(S) : Joydeep Sen Sarma et al.

Page 1 of 1

It is certified that error appears in the above-identified patent and that said Letters Patent is hereby corrected as shown below:

In the Claims:

In col. 12, line 10 should read:
and the plurality of ownership <u>attributes</u> are required to agree for In col. 12, line 12 should read:
logical arrangement <u>of</u> storage space;

In col. 12, line 33 should read:
a plurality of ownership attributes <u>to indicate</u> that a selected storage In col. 12, line 38 should read:
arrangement <u>of</u> storage space;

In col. 12, line 44 should read:
after the ~~of~~ plurality of ownership attributes indicates that In col. 12, line 53 should read:
the first storage system <u>or</u>~~of~~ the second storage system In col. 13, line 22 should read:
logical arrangement ~~of~~ storage space owned by a first storage In col. 13, line 36/37 should read:
process to change the plurality of ownership attributes ~~of the logical arrangement of storage space~~ indicates that Signed and Sealed this  
Twentieth Day of May, 2014

Michelle K. Lee  
*Deputy Director of the United States Patent and Trademark Office*